April 28, 1964  A. C. ROBINSON  3,130,662
MEAT COOKERS

Filed July 7, 1959  5 Sheets-Sheet 1

INVENTOR.
AUBREY C. ROBINSON
BY
*Linton and Linton*
ATTORNEYS.

INVENTOR.
AUBREY C. ROBINSON

INVENTOR.
AUBREY C. ROBINSON
BY
Linton and Linton
ATTORNEYS.

April 28, 1964     A. C. ROBINSON     3,130,662
MEAT COOKERS
Filed July 7, 1959     5 Sheets-Sheet 4
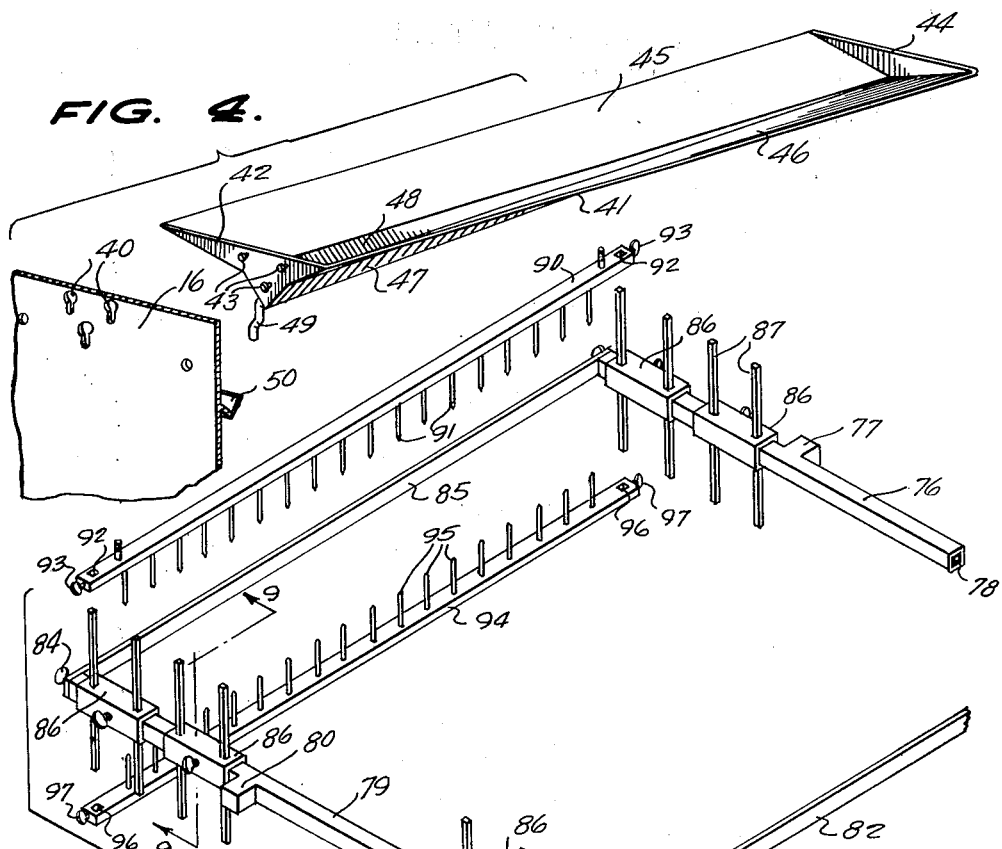
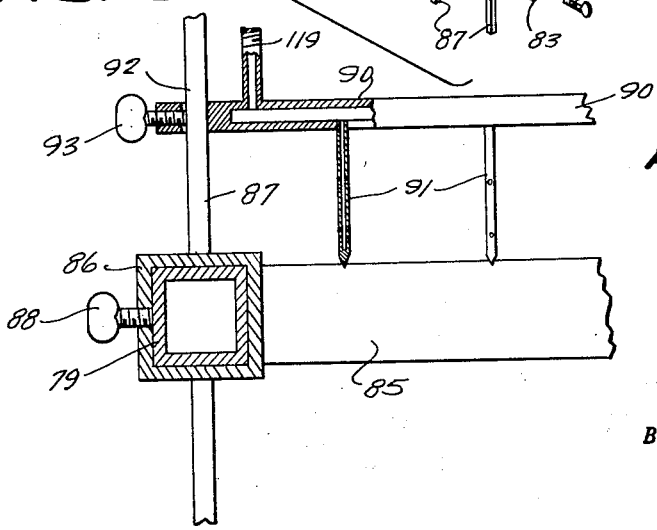
INVENTOR.
AUBREY C. ROBINSON
BY
*Linton and Linton*
ATTORNEYS April 28, 1964
A. C. ROBINSON
3,130,662
MEAT COOKERS
Filed July 7, 1959
5 Sheets-Sheet 5
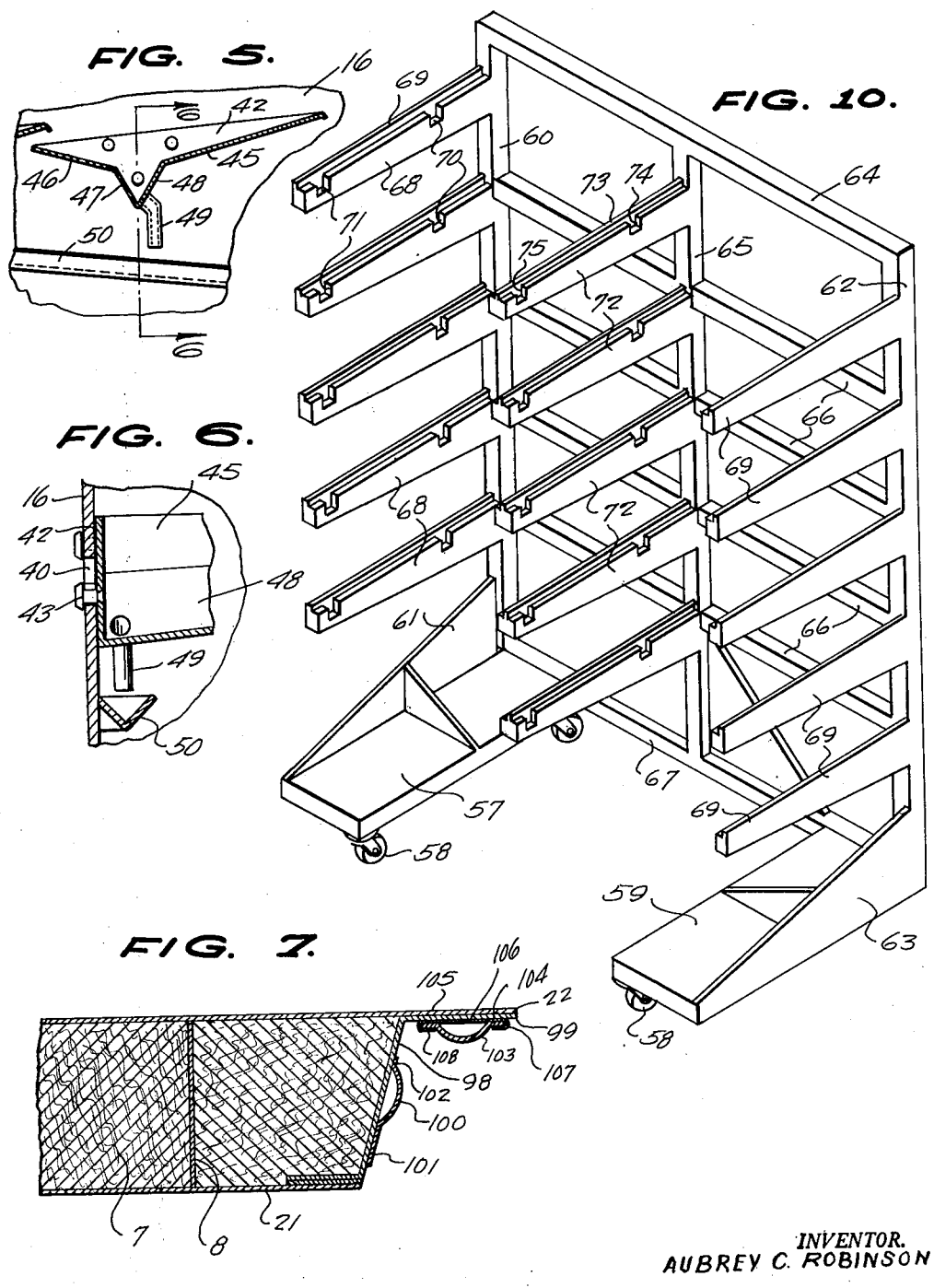
INVENTOR.
AUBREY C. ROBINSON
BY
Linton and Linton
ATTORNEYS.

3,130,662
MEAT COOKERS
Aubrey C. Robinson, 1206 9th St. NW.,
Washington, D.C.
Filed July 7, 1959, Ser. No. 825,518
5 Claims. (Cl. 99—260)

The present invention is related to spit-type cookers and is more particularly concerned with a cooker and method for simultaneously handling large quantities of meat, fowl or seafood in a manner simulating open pit cooking.

The principal object of the present invention is to provide a cooker for the commercial cooking of meats in large quantities in a minimum amount of space under controlled conditions and economically both as to the operation of the cooker and in the prevention of loss of body of the meats being cooked.

A further and important object of the invention is to provide a cooker capable of passing a vapor such as smoke, steam, heated air or the like against the bottom of and around the meats being cooked with the vapor continuously moving in endless swirling paths in the cooker without loss of heat and with the temperature thereof being controlled throughout its movements past said meats.

Another and equally important object is to provide a cooker having successive superimposed supports for large quantities of meats to be cooked and means for causing a swirling of heated vapor around said meats with the vapor being deflected and reheated between the successive supports in a controlled manner simulating open fire cooking.

A still further important object of the invention is to provide a cooker wherein large quantities of meats can be easily and quickly transported into and from the cooker and supported therein by the same means during cooking operations and in which cooker the grease from the cooking meats is gathered and removed from the cooking area.

Further objects of the invention will be in part obvious and in part pointed out in the following description of the accompanying drawings wherein:

FIG. 4 is an enlarged exploded perspective view of a drain pan and deflector showing its detachable connection to the back of the cooker.

FIG. 5 is a cross-sectional view of said drain pan and deflector as mounted for use.

FIG. 6 is a further enlarged sectional detail view of the mounted end portion of said drain pan taken on line 6—6 of FIG. 5.

FIG. 7 is a greatly enlarged sectional detail view of the free edge portion of one of the cooker doors.

FIG. 8 is an exploded perspective view of a portion of the elements of one of the spits.

FIG. 9 is a greatly enlarged sectional detail view taken on line 9—9 of FIG. 8.

Figure 1:
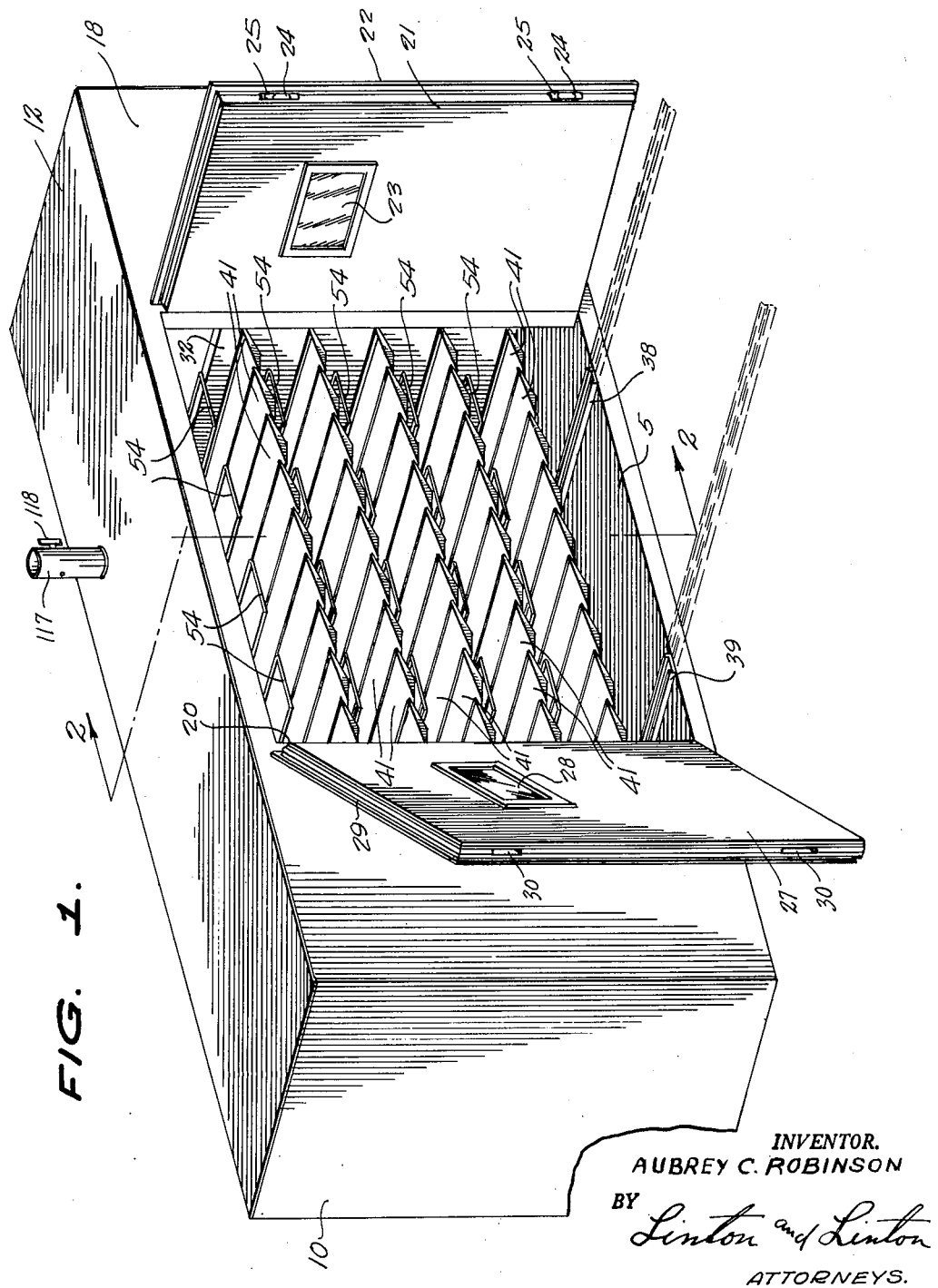
FIG. 1 is a front perspective view of the cooker with the doors open and without the meat supporting dolly therein.

And FIG. 10 is an enlarged perspective view of the spit dolly.

Referring now more particularly to the drawings wherein like and corresponding parts are designated by similar reference characters, numeral 1 indicates the cooker body outer metal bottom upon which is positioned a layer 2 of flexible insulation, a rigid insulating material such as layer 3 bricks, for example, and preferably fire bricks. A second layer 4 of flexible insulation covers layer 3 while the inner metal bottom 5 is positioned on layer 4. An outer metal end 6 is lined with a heat insulator 7 and is supported by framework 8 to which is attached the inner metal end 9 with said ends 6 and 9 being connected to bottoms 1 and 5, respectively. At the opposite end of said bottoms 1 and 5 there is mounted the upright end 10 and inner end 11 both of metal between which is positioned insulation 7 and framing 8. A metal top 12 is supported upon ends 6 and 10 while an inner metal top 13 is supported upon inner ends 9 and 11 and also upon a channel 14 connecting the inner ends and top together while channel members 15 likewise reinforce the top and ends. The inner metal back 16 is mounted upon inner members 5, 9, 11 and 13 extending completely thereacross, while an outer metal back 17 extends between and is connected to bottom 1, ends 6 and 10 and top 12. Insulation and framing 8 is also connected to and positioned between backs 16 and 17.

A front 18 extends between and is connected to ends 6 and 10, bottom 1 and top 12 while an inner front 19 is likewise connected to and extends between bottom 5, ends 9 and 11 and top 13. Said fronts 18 and 19 are also made of metal and have insulation 7 and framing 8 therebetween. Also, these fronts 18 and 19 have a central opening 20 which is of a width and height substantially equivalent to the cooking area of the present apparatus as will be explained hereinafter. For the purpose of closing opening 20 there is provided a door 21 hinged to front 18 and having an edge flange 22 as well as an observation window 23. Door 21 also has end slot 24 through which extend retractable latches 25 operated by an exterior handle 26. There is also provided a second door 27 which has an observation window 28, top and bottom flange 29 and slots 30. Door 27 is also hinged to front 18 and said doors 21 and 27 are of a size when pivoted against front 18 for closing opening 20 in a leakproof manner. When said doors are closed operation of handle 26 can cause latches 25 to enter slots 30 for locking said doors together.

Within the interior of the cooker there extends a pair of substantially parallel spaced apart partitions 32 and 35. Partition 32 extends from back 16 completely to the inner front 19 adjacent opening 20 but has its top 33 spaced from top 13 and its bottom 34 spaced from bottom 5. Similarly, partition 35 extends completely from back 16 to front 19 adjacent the other end of opening 20 while its top 36 is spaced from inner top 13 and its bottom 37 is spaced from inner bottom 5. These partitions form the cooking area therebetween and are preferably of a heat insulating construction.

A pair of tracks 38 and 39 are mounted upon inner bottom 5 leading to opening 20 and extend to inner back 16 between said partitions.

Inner back 16 has a plurality of slotted openings 40 formed therethrough. These openings 40 are arranged for positioning superimposed spaced apart series of deflectors and drain pans 41 extending from said back 16 between partitions 32 and 35. Each of these drain pans has a flat end 42 from which extend buttons 43 capable of being inserted through and dropped into the slots of openings 40 connecting end 42 to the inner back 16. The deflector and drain pans 41 further have an opposite end 44 with divergent bottom sides 45 and 46 connected to said ends 42 and 44. A V-shaped gradually deepening trough consisting of triangular sides 47 and 48 is connected to the bottom sides 46 and 45 and said ends 42 and 44 all in a leakproof manner which increases the stability of the deflector so that the same can extend in cantilever fashion from back 16 without additional support. A drain tube 49 extends from the deepest end of side 48 above the trough 50 mounted on a downward slant upon the back 16 with all of the troughs being connected by tube 53 to a collection container 54'.

Figure 3:
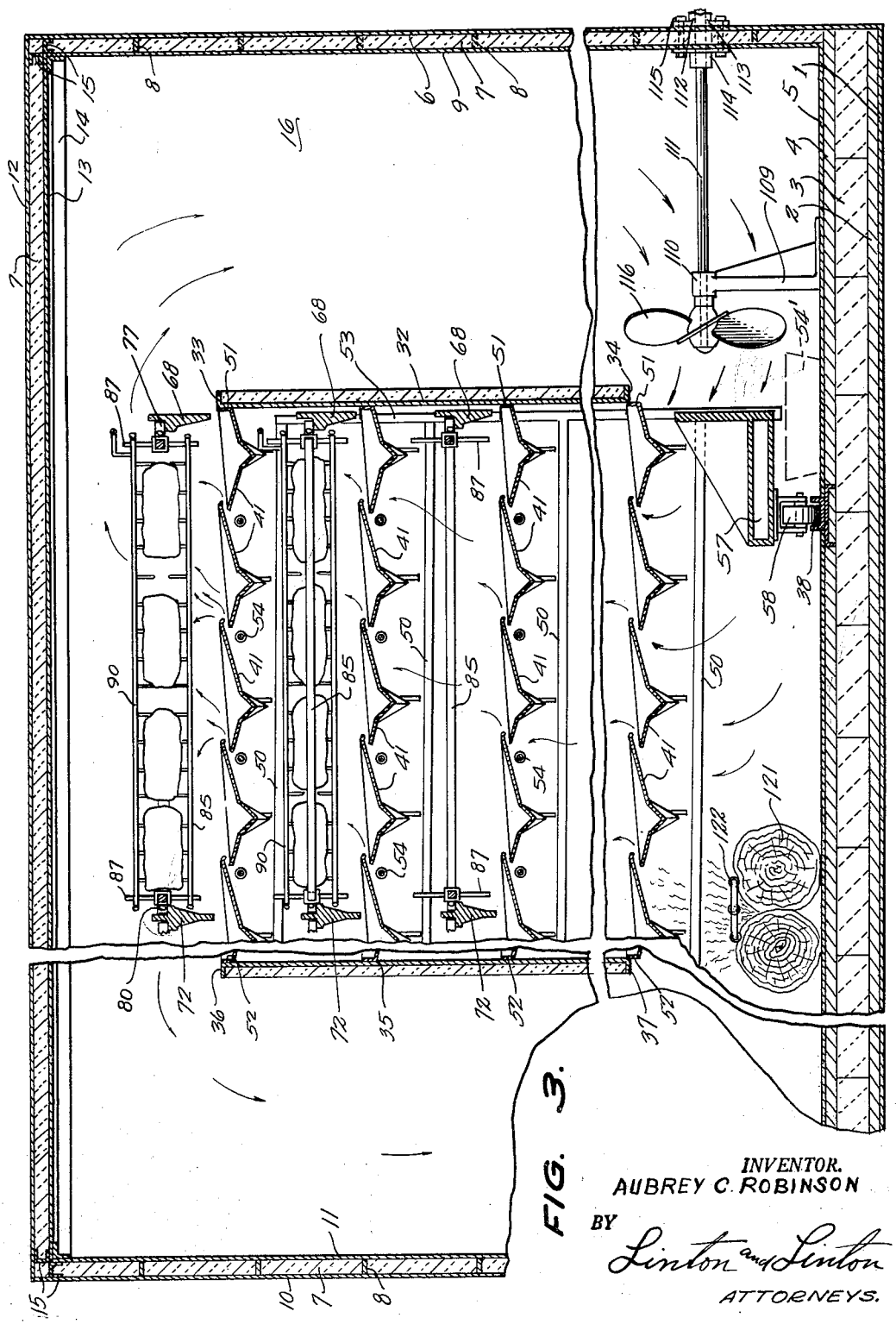
FIG. 3 is a cross-sectional view taken on line 3—3 of FIG. 2.

Openings 40 are arranged so that they support a series of said deflectors 41 as shown in FIGURES 1 and 3 side-by-side but with overlapping marginal edges between the adjacent bottom sides 45 and 46 and also positioned a plurality of such series of deflectors spaced above one another between partitions 32 and 35. Deflectors 41 adjacent partition 32 have an upright side 51 for being positioned against said partition to prevent the escape of vapor therebetween. Deflectors 41 adjacent partition 35 similarly have a bottom side 46 bent upwardly providing an upright wall 52 to be positioned against partition 35.

Superimposed series of electrical heating Calrods 54 extend from back 16 with a leg thereof which is below each of the overlapping marginal edges of adjacent deflectors 41. These heating rods extend through backs 16 and 17 and are retained by threaded ends 55 having bolts 56 thereon and are connected to a suitable source of electric current directly or through applicable control circuits not shown. A spit-supporting dolly has a pair of spaced apart bases 57, 59 mounted upon rollers 58 positioned for traveling on tracks 38 and 39. An upright 60 is mounted upon one end of base 57 and connected to a reinforced plate 61 on said base. A second upright 62 is mounted upon a corresponding end of base 59 and connected to a reinforcing plate 63. A cross member 64 joins the upper ends of uprights 60 and 62 while a metal upright 65 having lateral arms 66 connected to uprights 62 and 60 extends between top 64 and a bottom connector 67 joining said bases. From said uprights 60 and 62 there extends a plurality of superimposed arms 68 connected at one end to said uprights and extending above base 57. Each arm has an upright flange 69 and top slots 70 and 71. Upright 65 has a plurality of lateral arms 72. Each arm 72 has a flange 73 running longitudinally from the middle of the arm with top slots 74 and 75 on each side of said flange. Arms 68 and 72 for each level extend in the same plane for supporting spits 76 therebetween.

Each of the spits 76 has a stub axle 77 extending laterally thereof with threaded openings 78 in the opposite ends of the spit side while a corresponding side 79 has a lateral stub axle 80 and threaded end openings 81. An end bar 82 having end openings 83 is fastened to sides 76 and 79 by thumb screws 84 extending into openings 78 and 81. Similarly an end bar 85 has end openings through which thumb screws 84 likewise extend into the openings 78 and 81 in the opposite ends of the sides 76 and 79. Squared tubular slides 86 are previously slid onto sides 76 and 79 with said sides extending through bores 89. A plurality of uprights 87 extend from each slide and a thumb screw 88 extends through the side for engaging one of the sides 76 or 79 for retaining the slides 86 in position. Each upright 87 has a spit bar 90 mounted thereon which bars have a plurality of pointed prongs 91 extending downwardly therefrom. The upright 87 extends through openings 92 and are retained by thumbscrews 93. Similarly, spit bar 94 having upwardly extending prongs 95 have uprights 87 extending through openings 96 and are retained thereon by thumb screws 97. Each of the prongs 91 and 95 are tubular for permitting the flow of fluid therethrough as will be hereinafter described. Each of the spits are mounted on the dolly by positioning an axle in a slot 70, for example, and the opposite axle 80 in an opposite slot 74.

The door 21 has a slanted end 98 connected to the inner face of said door and a bent end portion 99 connected to flange 22. A spring semi-circular member 100 has flat end portions 101 and 102 with one of said end portions fixedly connected to door end 98, a second spring semi-circular member 103 has flat end portions 104 and 105 retained within the channel member 106 having U-shaped end portions 107 and 108 with said channel connected to portion 99.

An upright 109 is mounted upon inner bottom 5 and has a bearing 110 through which extends a shaft 111. Said shaft extends through a packing block 112 whose flanges 113 and 114 are retained by bolts 115 to end walls 6 and 9. A fan 116 is fixedly connected on shaft 111 for being rotated when said shaft is driven by any conventional means not shown.

An exhaust pipe 117 is mounted through top 12—13 and has a control valve 118 for being manually operated and opened and closed thereby.

A hose 119 is connected to each of the prongs 91 and to a tank 120 for supplying a basting fluid to said prongs.

Figure 2:
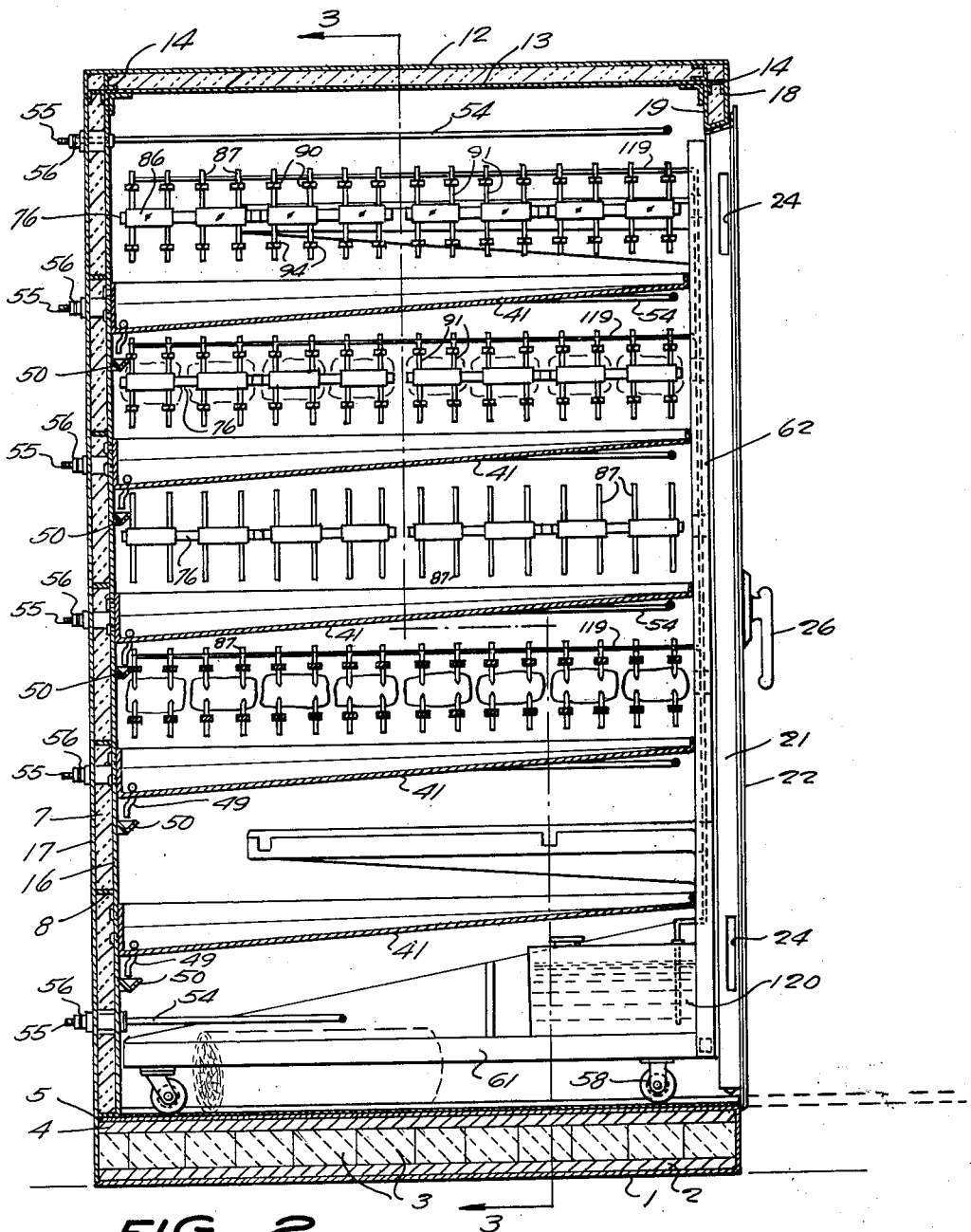
FIG. 2 is a cross-sectional view taken on line 2—2 of FIG. 1.

In the operation of the present device spits containing rows of meat retained therebetween, for example, the present spits 76 with the prongs 91 and 95 inserted within the meat are positioned upon the dolly of FIGURE 10 and rolled upon tracks 38 and 39 completely within the cooker as shown in FIGURE 2 with the arms 68, 72 and 69 extending between superimposed series of deflectors 41, that is, with a series of deflectors below the arms and a series of heating rods 54 and deflectors above the meat. Hickory or oak logs 121, for example, are placed upon the inner bottom 5 between the bases 57 and 59 and a suitable electrical heating element 122 is placed in contact therewith. Thereafter doors 21 and 27 are closed and locked and the valve 118 closed so that the cooker housing is completely closed and sealed off. Thereupon, current is supplied to the heating rods 54 and 122 whereupon smoke is produced from the logs which being heated passes upwardly against the first series of deflectors 42 between the overlapping marginal edges of these deflectors where it is directed against the bottom of the meat on the spit directly thereabove and said heated smoke swirls upwardly toward the heating rods 54 thereabove where it is reheated and deflected by the deflectors 41 directly thereabove to the next layer of spits and meat. The smoke continues upwardly in this manner through each series of deflectors, heating rods and spits until it passes over the upper ends 33 and 36 of the partitions 32 and 35 where it cools and passes downwardly to beneath the lower ends 34 and 37 of said partitions and upon being reheated naturally flows back up between said partitions. This process continues until the meats are impregnated with the smoke through the lower half thereof and as necessary additional smoke can be produced from time to time and the smoke aided in its movement by the fan 116. Valve 118 can be opened, if necessary, for permitting the escape of atmosphere from within the housing and the rods 54 controlled to supply the proper heat to the rising vapor.

The deflectors 41 further receive grease and the like from the cooking meat thereabove, whereupon it drains through each of the pipes 49 into the troughs 50 to container 54'. The bottom of said deflectors is preferably blackened so as not to deflect heat downwardly as their purpose is to deflect the loose heat and vapors from above the upper portions of the meats.

As soon as the lower half of the meat is completely smoked, doors 21 and 27 are opened, the dolly withdrawn from the housing and the spits turned over placing the uncooked portions of the meats downwardly and the dolly reinserted in the housing, whereupon the meats are then cooked until completed after again shutting the doors of the housing. The spring members 100 and 103 of door 21 engage door 27 for providing a seal-proof mounting therebetween.

The tank 120 can be connected through a pipe, not shown, which extends through the wall of the housing 10 to a pressurized source of fluid or said tank can be closed and due to the heat within the housing the pressure of the fluid in tank 120 will increase, forcing the fluid through the hose 119 to each of the prongs 91 and 95.

It is to be appreciated that in lieu of smoke, steam or other vapors can equally as well be directed in endless paths to and around said partitions for treating meats therebetween. Also the term "meat" is not limited to those of animals but applies equally as well to fowls or seafood.

The present device is capable of considerable modification and such changes thereto as come within the scope of the appended claims are deemed to be a part of the present invention.

I claim:
1. An apparatus for cooking meats comprising a closed housing, partitions extending laterally across the interior of said housing from front to back, but spaced from the top and bottom and ends of said housing providing vapor passageways between said housing and said partition, a plurality of superposed spaced apart series of deflectors positioned between said partitions, said series of deflectors each containing a plurality of deflectors positioned with overlapping spaced marginal edges providing lateral passageways therebetween, each of said deflectors having upwardly divergent bottom sides for directing vapor to said lateral passageways, electrical heating elements positioned below and adjacent to each of said lateral passageways, a source of electrical current for said heating elements, means for supporting said meats in successive layers with each layer being above one of said series of deflectors, means for producing a heat vapor below the lowermost series of deflectors and means for moving said vapors from said producing means upwardly between said partitions, said lateral passageways, said heating element and drawing said vapors downwardly through said vapor passageway.

2. An apparatus for cooking meats as claimed in claim 1 wherein each of said deflectors has a trough between said bottom sides gradually deepening towards one end of said deflector, end plates closing off said bottom sides and said trough at each end of said deflector, means for detachably connecting one of said end plates to said housing and means for conveying fluid material from said trough at its deepest end.

3. An apparatus for cooking meats as claimed in claim 1, wherein said means for supporting said meats includes a plurality of tubular bars, a plurality of tubular prongs to be driven into said meat affixed to each of said bars, a frame for detachably supporting said bars between said deflectors and means for feeding a fluid to said prongs and bars to be fed thereby into said meats.

4. An apparatus for cooking meats as claimed in claim 1, wherein said means for supporting said meats comprises a mobile upright frame, a plurality of arms connected at one end only to said frame and positioned laterally thereof for extending between adjacent series of deflectors and spits detachably mounted on said arms for holding said meats.

5. An apparatus for cooking meats comprising a closed housing, partitions extending laterally across the interior of said housing, but spaced at the top and bottom therefrom, a plurality of superposed spaced apart series of deflectors positioned between said partitions, said series of deflectors each containing a plurality of deflectors positioned with overlapping spaced marginal edges providing lateral passageways therebetween, electrical heating elements positioned below each of said series of deflectors, a source of electrical current for said heating elements, means for supporting said meats in successive layers with each layer being above one of said series of deflectors, means for producing a heat vapor below the lowermost series of deflectors, said housing having at least two opposing sides, one of said housing opposing sides having doors therein, the other of said housing opposing sides having a plurality of openings therein each with a narrower appended slot, each of said deflectors having at least one T-shaped member extending from an end thereof being detachably positioned within one of said housing side slots supporting said deflector laterally of said housing side towards said doors.

References Cited in the file of this patent

UNITED STATES PATENTS

| 1,630,188 | Knauff | May 24, 1927 |
| 1,964,372 | Tygart | June 26, 1934 |
| 2,075,407 | Schwartzman | Mar. 30, 1937 |
| 2,123,040 | Hanak | July 5, 1938 |
| 2,138,813 | Bemis | Dec. 6, 1938 |
| 2,199,584 | Bemis | May 7, 1940 |
| 2,238,309 | Cramer | Apr. 15, 1941 |
| 2,331,266 | Cramer | Oct. 5, 1943 |
| 2,458,239 | Bartlett | Jan. 4, 1949 |
| 2,734,499 | Lombardi | Feb. 14, 1956 |
| 2,789,877 | Pfundt | Apr. 23, 1957 |
| 2,905,077 | Del Francia | Sept. 22, 1959 |

FOREIGN PATENTS

| 665,444 | Germany | Sept. 8, 1938 |
| 717,320 | France | Oct. 19, 1931 |
| 979,972 | France | Dec. 20, 1950 |